(12) United States Patent
Tashiro et al.

(10) Patent No.: US 11,855,284 B2
(45) Date of Patent: Dec. 26, 2023

(54) POSITIVE ELECTRODE ACTIVE MATERIAL PRECURSOR FOR NON-AQUEOUS ELECTROLYTE SECONDARY BATTERY

(71) Applicant: SUMITOMO METAL MINING CO., LTD., Tokyo (JP)

(72) Inventors: Kenji Tashiro, Ehime (JP); Kentaro Sogabe, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 191 days.

(21) Appl. No.: 16/766,392

(22) PCT Filed: Nov. 27, 2018

(86) PCT No.: PCT/JP2018/043643
§ 371 (c)(1),
(2) Date: May 22, 2020

(87) PCT Pub. No.: WO2019/107373
PCT Pub. Date: Jun. 6, 2019

(65) Prior Publication Data
US 2020/0350578 A1    Nov. 5, 2020

(30) Foreign Application Priority Data
Nov. 28, 2017   (JP) ................................ 2017-228253

(51) Int. Cl.
*H01M 4/525*    (2010.01)
*H01M 10/0525*  (2010.01)
(Continued)

(52) U.S. Cl.
CPC .......... *H01M 4/525* (2013.01); *C01G 53/006* (2013.01); *H01M 10/0525* (2013.01);
(Continued)

(58) Field of Classification Search
None
See application file for complete search history.

(56) References Cited

U.S. PATENT DOCUMENTS

2015/0155548 A1    6/2015   Ryoshi et al.
2015/0364761 A1*  12/2015   Fukui ............... C01G 53/006
                                                        429/223
(Continued)

FOREIGN PATENT DOCUMENTS

CN    105580160     5/2016
JP    2011-057518   3/2011
(Continued)

OTHER PUBLICATIONS

International Search Report dated Feb. 26, 2019 with respect to PCT/JP2018/043643.

*Primary Examiner* — Ronak C Patel
(74) *Attorney, Agent, or Firm* — IPUSA, PLLC

(57) ABSTRACT

A positive electrode active material precursor for a non-aqueous electrolyte secondary battery, including-nickel composite hydroxide particles, is provided, wherein a cross section of each nickel composite hydroxide particle includes voids, and an average value of a ratio of an area of the voids in an area of each of the plurality of regions partitioned by predetermined boundary lines, is greater than or equal to 0.5% and less than or equal to 5.0%, and a standard deviation of the ratio of the area of the voids in the area of each of the plurality of regions partitioned by the predetermined boundary lines, is less than or equal to 1.0.

3 Claims, 3 Drawing Sheets

(51) Int. Cl.
*C01G 53/00* (2006.01)
*H01M 4/02* (2006.01)

(52) U.S. Cl.
CPC ...... *C01P 2004/34* (2013.01); *C01P 2004/61* (2013.01); *C01P 2006/40* (2013.01); *H01M 2004/028* (2013.01)

(56) References Cited

U.S. PATENT DOCUMENTS

| | | |
|---|---|---|
| 2017/0162850 A1 | 6/2017 | Murakami et al. |
| 2018/0316006 A1 | 11/2018 | Kaneda et al. |
| 2019/0020023 A1 | 1/2019 | Yokoyama et al. |

FOREIGN PATENT DOCUMENTS

| | | |
|---|---|---|
| JP | 2012-119093 | 6/2012 |
| JP | 2015-164123 | 9/2015 |
| JP | 2015-227263 | 12/2015 |
| JP | 2016-054101 | 4/2016 |
| JP | 2016-138024 | 8/2016 |
| JP | 2017-054583 | 3/2017 |
| JP | 2017-065975 | 4/2017 |
| JP | 2017-084628 | 5/2017 |
| WO | 2013/183711 | 12/2013 |

\* cited by examiner

POSITIVE ELECTRODE ACTIVE MATERIAL PRECURSOR FOR NON-AQUEOUS ELECTROLYTE SECONDARY BATTERY

TECHNICAL FIELD

The present invention relates to a positive electrode active material precursor for a non-aqueous electrolyte secondary battery.

BACKGROUND ART

In recent years, with the spread of mobile electronic devices such as mobile phones and notebook personal computers, the development of compact, lightweight secondary batteries with high energy density is required. Further, development of high-output secondary batteries as batteries for electric vehicles such as hybrid vehicles, is also required. Lithium-ion secondary batteries have been found to be suitable non-aqueous electrolyte secondary batteries that satisfy these requirements.

A lithium-ion secondary battery is formed of, for example, a negative electrode, a positive electrode, an electrolyte solution, and the like, and as the active material of the negative electrode and the positive electrode, a material by which lithium can be de-inserted and inserted, is used.

With a lithium-ion secondary battery in which a lithium composite oxide, in particular, a lithium-cobalt composite oxide that is relatively easy to synthesize, is used as the positive electrode material, it is possible to obtain a high voltage of up to 4 V, and, therefore, lithium-ion secondary batteries are expected to have high energy density and are increasingly being put to practical use. With respect to batteries using a lithium-cobalt composite oxide, numerous developments have been made to obtain superior initial capacity characteristics and cycle characteristics, and a variety of results have already been achieved.

However, because a lithium-cobalt composite oxide uses an expensive cobalt compound as a raw material, the unit price per volume of a battery using lithium-cobalt composite oxide is significantly higher than that of a nickel hydride battery, and, therefore, application of a battery using a lithium-cobalt composite oxide is considerably limited.

For this reason, with respect to compact secondary batteries for mobile devices and large secondary batteries for electric power storage and electric vehicles, there are high expectations to reduce the cost of the positive electrode material, so that cheaper lithium-ion secondary batteries can be manufactured, and the realization of such lithium-ion secondary batteries will have great industrial significance.

As a new material of an active material for lithium-ion secondary batteries, there is a lithium-nickel composite oxide using nickel, which is less expensive than cobalt. This lithium-nickel composite oxide has a lower electrochemical potential than the lithium-cobalt composite oxide, and, therefore, decomposition due to oxidation of the electrolytic solution is unlikely, and a higher capacity can be expected, and because the lithium-nickel composite oxide exhibits a high battery voltage similar to that of the cobalt system, development of the lithium-nickel composite oxide has been actively carried out.

However, when a lithium-ion secondary battery is fabricated by using, as the positive electrode material, a lithium-nickel composite oxide synthesized purely only by nickel, the lithium-ion secondary battery will have a disadvantage that the cycle characteristics are inferior to those of the cobalt system, and the battery performance is relatively easily impaired by use and storage in a high-temperature environment. For this reason, a lithium-nickel composite oxide in which a portion of the nickel is replaced by cobalt or aluminum, is generally known.

Conventionally, various methods have been proposed for manufacturing a positive electrode active material for a non-aqueous electrolyte secondary battery including a lithium-cobalt composite oxide, a lithium-nickel composite oxide, and the like. For example, there is proposed a method of manufacturing a positive electrode active material for a non-aqueous electrolyte secondary battery, in which a positive electrode active material precursor for a non-aqueous electrolyte secondary battery such as a nickel composite oxide is mixed with a lithium compound, and the resulting mixture is fired.

For example, Patent Document 1 discloses a method of manufacturing a positive electrode active material for a non-aqueous electrolyte secondary battery, characterized by including:

a crystallization process in which an alkaline solution is added to a mixed aqueous solution of Ni salt and M salt to co-precipitate the hydroxide of Ni and M, and the resulting precipitate is filtered, washed with water, and dried, to yield a nickel composite hydroxide: $Ni_xM_{1-x}(OH)_2$;

a firing process in which the resulting nickel composite hydroxide: $Ni_xM_{1-x}(OH)_2$ and a lithium compound are mixed so that the molar ratio: Li/(Ni+M) of Li to the sum of Ni and M is 1.00 to 1.15, and the mixture is then fired at a temperature of greater than or equal to 700° C. and less than or equal to 1000° C. to yield a lithium-nickel composite oxide; and a water-washing process in which the resulting lithium-nickel composite oxide is subjected to a water-washing process.

CITATION LIST

Patent Document

[Patent Document 1]
Japanese Unexamined Patent Application Publication No. 2012-119093

SUMMARY OF INVENTION

Technical Problem

However, in recent years, further improvements in the performance of lithium-ion batteries have been required. Therefore, with respect to a lithium-nickel composite oxide that is a positive electrode active material for a non-aqueous electrolyte secondary battery, in order to sufficiently increase the output voltage when used, for example, in a non-aqueous electrolyte secondary battery, it is required to reduce the reaction resistance.

Thus, in view of the above-described problems in the conventional technology, it is an object of an aspect of the present invention to provide a precursor of a positive electrode active material for a non-aqueous electrolyte secondary battery that can reduce the reaction resistance, when used as a non-aqueous electrolyte secondary battery.

Solution to Problem

In order to solve the above problem, according to an embodiment of the present invention, there is provided a positive electrode active material precursor for a non-aqueous electrolyte secondary battery, including:
a nickel composite hydroxide particle, wherein
a cross section of the nickel composite hydroxide particle includes a void, and
when the cross section of the nickel composite hydroxide particle is divided into a plurality of regions by boundary lines arranged in a grid such that each of the plurality of regions partitioned by the boundary lines has a size of 2 μm square,
an average value of a ratio of an area of the void in an area of each of the plurality of regions partitioned by the boundary lines, is greater than or equal to 0.5% and less than or equal to 5.0%, and
a standard deviation of the ratio of the area of the void in the area of each of the plurality of regions partitioned by the boundary lines, is less than or equal to 1.0.

Advantageous Effects of Invention

According to an embodiment of the present invention, it is possible to provide a positive electrode active material precursor for a non-aqueous electrolyte secondary battery that provides reduced reaction resistance when it is used in a non-aqueous electrolyte secondary battery.

DESCRIPTION OF EMBODIMENTS

Figure 1:
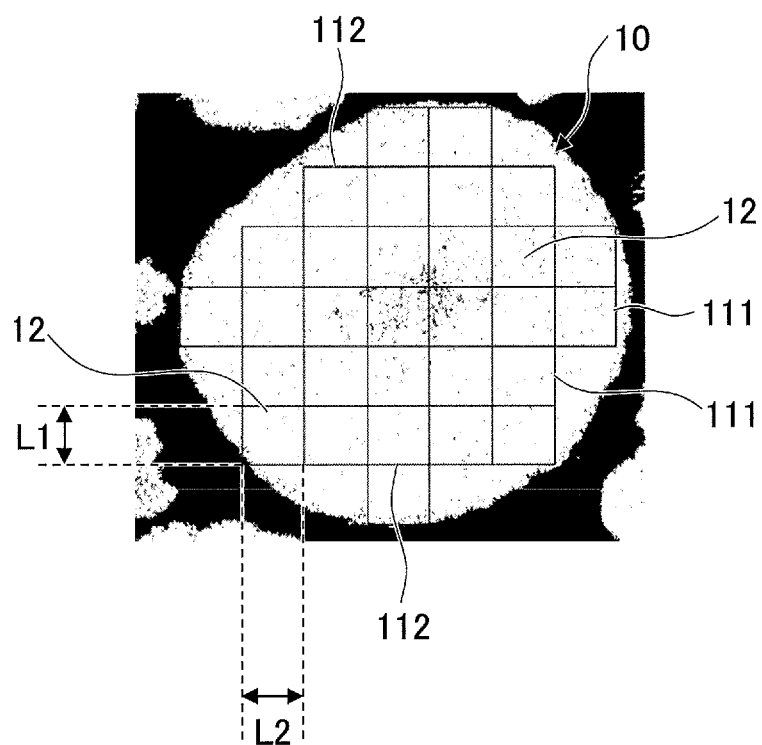
FIG. 1 is a diagram illustrating boundary lines in a cross section of nickel composite hydroxide particles according to an embodiment of the present invention.

In the following, embodiments of the present invention will be described with reference to the accompanying drawings; however, the present invention is not limited to the following embodiments, and various modifications and substitutions can be made to the following embodiments without departing from the scope of the present invention.

[Positive Electrode Active Material Precursor for Non-Aqueous Electrolyte Secondary Battery]

First, an example of a configuration of a positive electrode active material precursor for a non-aqueous electrolyte secondary battery according to the present embodiment will be described.

The positive electrode active material precursor for a non-aqueous electrolyte secondary battery according to the present embodiment can include nickel composite hydroxide particles. Further, the nickel composite hydroxide particles may include voids in the cross section of each of the particles.

It is preferable that the following requirements are fulfilled when the cross section of each of the nickel composite hydroxide particles is divided into a plurality of regions by boundary lines arranged in a grid such that the size of each of the partitioned regions is 2 μm square.

The average value of the ratio of the area of the voids in the area of each region partitioned by the boundary lines, is greater than or equal to 0.5% and less than or equal to 5.0%.

The standard deviation of the ratio of the area of the voids in the area of each region partitioned by the boundary lines, is less than or equal to 1.0.

The inventors of the present invention diligently studied a precursor of a positive electrode active material for a non-aqueous electrolyte secondary battery (hereinafter, also simply referred to as a "positive electrode active material precursor"), which is capable of reducing the reaction resistance in a non-aqueous electrolyte secondary battery.

As a result, the present invention has been completed upon finding that, when a positive electrode active material precursor includes nickel composite hydroxide particles including voids inside the particles and the distribution of the voids satisfy a predetermined requirement, in a non-aqueous electrolyte secondary battery using the positive electrode active material prepared from the positive electrode active material precursor, the reaction resistance can be reduced at the positive electrode.

Hereinafter, the positive electrode active material precursor according to the present embodiment will be specifically described.

The positive electrode active material precursor according to the present embodiment can include nickel composite hydroxide particles. Note that the positive electrode active material precursor according to the present embodiment may consist of nickel composite hydroxide particles.

Each of the nickel composite hydroxide particles included in the positive electrode active material precursor according to the present embodiment can include voids in the cross section of the particle. The voids will be described with reference to FIG. 1.

As illustrated in FIG. 1, a plurality of boundary lines (division lines) 111 and 112 are arranged on the particle cross section of a nickel composite hydroxide particle 10 included in the positive electrode active material precursor according to the present embodiment, and by the boundary lines, the particle cross section can be divided into a plurality of regions 12. In this case, the boundary lines can be arranged such that each of the regions 12 partitioned by the boundary lines has a size of 2 μm square and the boundary lines form a grid.

In FIG. 1, only some of the boundary lines are denoted by reference numerals; however, a plurality of boundary lines can be arranged parallel to each of the boundary lines 111 and 112 so that there are regions partitioned by boundary lines over the entire cross section of the particle, as illustrated in FIG. 1. In this case, the boundary lines that are parallel to each other can be arranged so that the boundary lines that are adjacent to each other are spaced apart by 2 μm.

Note that the boundary lines 111 and 112 are hypothetically arranged in order to evaluate the distribution of the voids as described below in the nickel composite hydroxide particle.

As described above, each of the regions 12 partitioned by the boundary lines 111 and 112, and surrounded by the boundary lines 111 and 112, is a square with sides L1 and L2 being 2 μm. In FIG. 1, only some of the regions 12 are denoted by reference numerals, but each square region surrounded by the boundary lines 111 and 112 corresponds to the region 12 partitioned by the boundary lines 111 and 112.

According to the inventors of the present invention, it is preferable that the average value of the ratio of the area of the voids in the area of each of the regions 12 of the nickel composite hydroxide particle, is greater than or equal to 0.5%. This indicates that by setting the average value of the ratio of the area of the voids in each of the regions 12, to be greater than or equal to 0.5%, when the nickel composite hydroxide particle 10 is reacted with a lithium compound, the nickel composite hydroxide particle 10 will have sufficient voids for accommodating the lithium components. When the nickel composite hydroxide particles have sufficient voids for accommodating the lithium components, in a positive electrode active material prepared by using a positive electrode active material precursor including the nickel composite hydroxide particles, it will be possible to retain a sufficient amount of lithium components within the particles. Therefore, it will be possible to reduce the reaction resistance at the positive electrode of the non-aqueous electrolyte secondary battery using the positive electrode active material. Further, the charge and discharge capacity can be increased. Particularly, the above-described average value is more preferably greater than or equal to 1.5%, and even more preferably greater than or equal to 1.6%.

However, if the ratio of the area of the voids in each region is too high, when reacted with a lithium compound, the diffusion of lithium components to the voids may not proceed uniformly. Therefore, the average value of the ratio of the area of the voids in each of the regions 12 is preferably less than or equal to 5.0%, and more preferably less than or equal to 4.0%.

Further, it is preferable that the standard deviation of the ratio of the area of the voids in each region partitioned by the boundary lines, is less than or equal to 1.0, and more preferably less than or equal to 0.8.

This indicates that by setting the standard deviation of the ratio of voids in each region partitioned by the boundary lines to less than or equal to 1.0, the ratio of the area of voids in each region will be substantially uniform. As described with reference to FIG. 1, the regions are arranged over the entire cross section of the nickel composite hydroxide particle, so that by setting the above-described standard deviation to less than or equal to 1.0, the voids will be distributed substantially uniformly on the cross section of the nickel composite hydroxide particle.

Therefore, by setting the above-described standard deviation to less than or equal to 1.0, when the positive electrode active material is prepared by using the positive electrode active material precursor according to the present embodiment, the lithium components can be accommodated and uniformly dispersed by the voids that are uniformly distributed in the nickel composite hydroxide particles. Therefore, in the positive electrode active material, the migration of lithium-ions is facilitated, and in the non-aqueous electrolyte secondary battery using the positive electrode active material, the reaction resistance at the positive electrode can be reduced. Further, the charge and discharge capacity can be increased. Note that the standard deviation of the ratio of the area of the voids in each region partitioned by the above-described boundary lines, can be greater than or equal to zero.

The particle size of the nickel composite hydroxide particle included in the positive electrode active material precursor according to the present embodiment is not particularly limited; however, the particle size of the nickel composite hydroxide particle is, for example, preferably greater than or equal to 5 µm and less than or equal to 30 µm, and more preferably greater than or equal to 9 µm and less than or equal to 15 µm.

Note that when the positive electrode active material precursor according to the present embodiment includes a plurality of nickel composite hydroxide particles, and when nickel composite hydroxide particles, which have a particle size near the average particle size, specifically, for example, a particle size within ±1 µm of the average particle size, are selected, and the boundary lines described above are arranged on the particle cross section, it is preferable that the average value and the standard deviation of the ratio of the area of the voids in each region are within the range described above.

When the positive electrode active material precursor positive electrode active material according to the present embodiment includes a plurality of nickel composite hydroxide particles, and when the boundary lines described above are arranged on the particle cross section, it is more preferable that the average value and the standard deviation of the ratio of the area of the voids in each region are within the range described above with respect to a number of particles corresponding to greater than or equal to 50% to less than or equal to 100% among the number of the plurality of nickel composite hydroxide particles.

When the positive electrode active material precursor positive electrode active material according to the present embodiment includes a plurality of nickel composite hydroxide particles, and when a plurality of particles to be evaluated are selected from the plurality of nickel composite hydroxide particles, it is preferable that the ratio of a number of particles satisfying the aforementioned requirements among the number of the plurality of particles to be evaluated, is greater than or equal to a certain value.

That is, when the cross section of each of the particles to be evaluated is divided into a plurality of regions by the boundary lines arranged in a grid so that each partitioned region has a sizes of 2 µm square, the ratio of the number of particles satisfying the following requirements, among the plurality of particles to be evaluated, is preferably greater than or equal to 50%, and more preferably greater than or equal to 70%.

The average value of the ratio of the area of voids in each region partitioned by the boundary lines is greater than or equal to 0.5% and less than or equal to 5.0%.

The standard deviation of the ratio of the area of voids in each region partitioned by the boundary lines is less than or equal to 1.0.

Note that among the above requirements, the average value of the ratio of the area of the voids in each region partitioned by the boundary lines is preferably greater than or equal to 1.5%, and more preferably greater than or equal to 1.6%. Further, the average value of the ratio of the area of the voids in each region partitioned by the boundary lines is preferably less than or equal to 4.0%.

Further, among the above requirements, the standard deviation of the ratio of the area of the voids in each region partitioned by the boundary lines is preferably less than or equal to 0.8. The standard deviation of the ratio of the area of the voids in each region partitioned by the boundary lines can be greater than or equal to 0.

The condition for selecting the particles to be evaluated from the plurality of nickel composite hydroxide particles is not particularly limited, but a plurality of particles having a particle size that is within ±1 µm of the average particle size of the plurality of nickel composite hydroxide particles, can be selected as the particles to be evaluated. That is, particles having a particle size of greater than or equal to −1 µm of the average particle size of the nickel composite hydroxide particles and less than or equal to +1 µm of the average particle size of the nickel composite hydroxide particles, can be selected as particles to be evaluated. The particle size of each of the nickel composite hydroxide particles can be an average value of the long side and the short side of the cross section of the particle, and can be calculated from observation results of SEM, etc.

The number of particles to be selected as particles to be evaluated is not particularly limited, but it is preferable to select, for example, greater than or equal to five nickel composite hydroxide particles as particles to be evaluated. In particular, it is more preferable to select greater than or equal to 10 nickel composite hydroxide particles as the particles to be evaluated. However, from the viewpoint of productivity, it is preferable to select less than or equal to 20 nickel composite hydroxide particles as the particles to be evaluated.

The positive electrode active material precursor according to the present embodiment can also include a plurality of nickel composite hydroxide particles having voids on the cross section of the particle as described above. That is, the positive electrode active material precursor according to the present embodiment can also include a nickel composite hydroxide powder. Note that the positive electrode active material precursor according to the present embodiment may consist of a nickel composite hydroxide powder.

In this case, it is preferable that the average value of the ratio of the area of the voids in the cross section of each of the plurality of nickel composite hydroxide particles is greater than or equal to 0.5% and less than or equal to 5.0%.

This indicates that by setting the average value of the ratio of the area of the voids in the particle cross section of each of the plurality of nickel composite hydroxide particles to greater than or equal to 0.5%, the plurality of nickel composite hydroxide particles will have sufficient voids for accommodating the lithium components. As there are sufficient voids for accommodating the lithium components, the reaction resistance can be particularly reduced at the positive electrode of the non-aqueous electrolyte secondary battery using the positive electrode active material prepared by using the positive electrode active material precursor including the plurality of nickel composite hydroxide particles. Further, the charge and discharge capacity can be particularly increased. The average value is more preferably greater than or equal to 1.5%, and even more preferably greater than or equal to 2.5%.

However, if the ratio of the voids is too high in the particle cross section of each of the plurality of nickel composite hydroxide particles, when reacted with a lithium compound, there is a risk that the diffusion of the lithium components into the voids may not proceed uniformly. Therefore, in the cross section of each of the plurality of nickel composite hydroxide particles, the average value of the ratio of the area of the voids is preferably less than or equal to 5.0% and more preferably less than or equal to 4.0%.

Note that, as the ratio of the area of the voids in the cross section of each nickel composite hydroxide particle, which is used in calculating the average value of the ratio of the area of the voids in the cross section of each of a plurality of nickel composite hydroxide particles, for example, it is also possible use an average value of the ratio of the area of the voids in each region partitioned by the boundary lines in the particle cross section of each of the nickel composite hydroxide particles described above. This is because the average value of the ratio of the area of voids in each region partitioned by the boundary lines, is calculated by arranging boundary lines across the entire particle cross section of each of the nickel composite hydroxide particles and calculating the void rate in each region, and is therefore substantially equal to the ratio of the area of voids in the cross section of each of the nickel composite hydroxide particles.

Further, in the plurality of nickel composite hydroxide particles, it is preferable that the standard deviation of the ratio of the area of the voids in the cross section of each of the plurality of nickel composite hydroxide particles is less than or equal to 1.0.

This indicates that by setting the standard deviation of the ratio of the region of the void in the cross section of each of the plurality of nickel composite hydroxide particles to less than or equal to 1.0, the ratio of the area of the voids in the particle cross section will be substantially uniform among the particles of the plurality of nickel composite hydroxide particles. Therefore, by setting the standard deviation to less than or equal to 1.0, when the positive electrode active material is prepared by using the positive electrode active material precursor according to the present embodiment, the lithium components can be uniformly dispersed in the positive electrode active material, thereby facilitating the migration of lithium-ions. Therefore, in the non-aqueous electrolyte secondary battery using the positive electrode active material, it is possible to reduce the reaction resistance at the positive electrode. Further, the charge and discharge capacity can be increased.

Note that in the plurality of nickel composite hydroxide particles, the standard deviation of the ratio of the area of the voids in the cross section of each of the plurality of nickel composite hydroxide particles can be greater than or equal to 0.

Note that when the positive electrode active material precursor according to the present embodiment includes a plurality of nickel composite hydroxide particles, the average particle size of the nickel composite hydroxide particles is not particularly limited; however, for example, the average particle size is preferably greater than or equal to 5 μm and less than or equal to 30 μm, and more preferably greater than or equal to 9 μm and less than or equal to 15 μm.

Here, the average particle size means the particle size at the cumulative value of 50% in the particle size distribution determined by the laser diffraction/scattering method. The average particle size in the present specification has the same meaning.

The method of calculating the area of the voids in the cross section of the nickel composite hydroxide particle included in the positive electrode active material precursor according to the present embodiment is not particularly limited, but any method can be used for the calculation.

For example, the following procedure can be used to for the evaluation.

The nickel composite hydroxide particle included in the positive electrode active material precursor according to the present embodiment is embedded in resin, and the surface is polished to fabricate a sample having the cross section exposed.

Then, the resulting sample is observed by scanning electron microscopy (SEM).

Next, the area of the voids in the cross section of the particle is calculated from the SEM image. The void is a recess, and, therefore, in a typical SEM image, the void portions are black and the other portions are white. For this reason, the specific means for calculating the area of the voids is not particularly limited; however, for example, a binarization process may be performed on the SEM image, and based on the obtained image, it is possible to calculate the area of black portions corresponding to the void portions and the area of white portions that is the area of other portions.

The binarization process requires a threshold for dividing a plurality of shading values into two values, and general methods for determining a threshold include a p-tile method, a mode method, a discriminant analysis method, and the like. In recent years, a large number of software for performing binarization processes on images has been provided, thereby enabling relatively easy binarization processes of images, including methods for determining thresholds. For example, when using the software "ImageJ", which is free-of-charge (free software), the threshold is determined by discriminant analysis and the SEM image can easily be binarized.

In the above-described case of arranging boundary lines on the cross section of a nickel composite hydroxide particle and calculating the area of the voids and the area other than voids for each of the regions partitioned by the boundary lines, the boundary lines can be set in advance in the SEM image of the cross section of the particle to be evaluated. Then, it is possible to calculate the area of the voids and the area other than voids for each region partitioned by the boundary lines.

Note that as described above, in the case of arranging boundary lines on the cross section of a nickel composite hydroxide particle and evaluating each region partitioned by the boundary lines, when the positive electrode active material precursor according to the present embodiment includes a plurality of nickel composite hydroxide particles, it is preferable to select and observe particles having a particle size near the average particle size, specifically, for example, particles having a particle size in the range of greater than or equal to 5 µm and less than or equal to 30 µm, to calculate the area of the voids, etc. In particular, it is more preferable to select and observe particles having a particle size of greater than or equal to 9 µm and less than or equal to 15 µm, to calculate the area of the voids, etc. Specifically, for example, it is preferable to select and observe particles having a particle size that is, for example, within ±1 µm of the average particle size, to calculate the area of the voids, etc. Note that the particles usually have indeterminate shapes, and, therefore, the particles to be evaluated can be selected by using the average value of the long side and the short side in the cross section as the particle size.

Further, when evaluating the average value or the standard deviation of the ratio of the area of the voids in the cross section of each of the plurality of nickel composite hydroxide particles, the number of particles to be evaluated is not particularly limited, but for example, it is preferable to evaluate greater than or equal to five nickel composite hydroxide particles. In particular, it is more preferable to evaluate greater than or equal to 10 nickel composite hydroxide particles. However, from the viewpoint of productivity, it is preferable to evaluate less than or equal to 20 nickel composite hydroxide particles.

In this case, it is preferable to select the particles to be evaluated so as to include particles having a particle size that is at least near the average particle size of the plurality of nickel composite hydroxide particles, specifically, for example, a particle size within ±1 µm of the average particle size. Note that as described above, the particles usually have irregular shapes, and, therefore, the particles to be evaluated can be selected by using the average value of the long side and the short side in the cross section as the particle size.

The composition of the nickel composite hydroxide particle included in the positive electrode active material precursor according to the present embodiment is not particularly limited as long as the nickel composite hydroxide particles can be mixed with a lithium compound to form a lithium-nickel composite oxide.

However, a lithium-nickel-cobalt composite oxide is useful as a positive electrode active material for a non-aqueous electrolyte secondary battery, and, therefore, a positive electrode active material precursor for manufacturing the lithium-nickel-cobalt composite oxide is required. For this reason, it is preferable that the nickel composite hydroxide particles are particles of a nickel composite hydroxide including nickel and cobalt.

Further, it is reviewed to enhance the battery characteristics by adding elements in addition to lithium, nickel, and cobalt to the lithium-nickel-cobalt composite oxide.

For this reason, it is preferable that the nickel composite hydroxide particles are particles of a nickel composite hydroxide including an element M (M is one or more kinds of elements selected from Mg, Al, Ca, Ti, V, Cr, Mn, Zr, Nb, Mo, Sr, and W) as an additive element.

Specifically, the nickel composite hydroxide particles of the positive electrode active material precursor according to the present embodiment can be, for example, particles of a nickel composite hydroxide represented by a general formula: $Ni_{1-x-y}Co_xM_y(OH)_{2+A}$. Note that in the above-described general formula, $0 \leq x \leq 0.35$, $0 \leq y \leq 0.35$, and $0 \leq A \leq 0.5$ may be set. The element M may be one or more kinds of elements selected from Mg, Al, Ca, Ti, V, Cr, Mn, Zr, Nb, Mo, Sr, and W.

The positive electrode active material precursor according to the present embodiment includes nickel composite hydroxide particles as described above, and can be mixed with a lithium compound to be used in the manufacturing of a positive electrode active material. Further, the positive electrode active material precursor according to the present embodiment can be roasted so that some of or all of the nickel composite hydroxide particles become nickel composite oxide particles, and the nickel composite oxide particles can be mixed with a lithium compound to be used for manufacturing the positive electrode active material.

According to studies by the inventors of the present invention, also when the positive electrode active material precursor according to the present embodiment is roasted, in a non-aqueous electrolyte secondary battery using the positive electrode active material prepared from the positive electrode active material precursor after being roasted, the reaction resistance at the positive electrode can be reduced. Further, the charge and discharge capacity can be increased.

It is probable that the above effects can be achieved because, even when the nickel composite oxide particles are used, there are uniform and sufficient voids in the cross section of each of the particles, similar to the case of the nickel composite hydroxide particles.

[Method of Manufacturing Positive Electrode Active Material Precursor]

The method of manufacturing the positive electrode active material precursor according to the present embodiment is not particularly limited, and the positive electrode active material precursor can be manufactured by any method as long as the included nickel composite hydroxide particles have the above described voids.

Hereinafter, an example of a configuration of a method of manufacturing a positive electrode active material precursor according to the present embodiment will be described.

The method of manufacturing the positive electrode active material precursor according to the present embodiment can include a crystallization process of co-precipitating the metal to be included, e.g., nickel, cobalt, and any additive element M.

An example of the configuration of the crystallization process will be described below.

In the crystallization process, it is possible to obtain the positive electrode active material precursor by, while stirring a reaction solution, supplying, to the reaction solution, a mixed aqueous solution including a metal salt (a) (hereinafter, also simply referred to as "mixed aqueous solution (a)") and an aqueous solution including an ammonium ion supplier (b) for forming the positive electrode active material precursor, and also supplying, to the reaction solution, a caustic alkali solution (c) so as to react with the aforementioned solutions, thereby causing solid-liquid separation, washing with water, and drying with respect to the particles of the crystallized positive electrode active material precursor. The mixed aqueous solution (a), the aqueous solution including the ammonium ion supplier (b), and the caustic alkali aqueous solution (c) may also be collectively referred to as a raw material solution.

Note that when starting the crystallization process, an initial aqueous solution, which is a mixture of water, the aqueous solution including the ammonium ion supplier (b), and the caustic alkali aqueous solution (c), can be prepared in the reaction tank. The initial aqueous solution is preferably prepared by adding, to the initial aqueous solution, the aqueous solution including the ammonium ion supplier (b) and the caustic alkali aqueous solution (c), and adjusting the temperature, so that the ammonium ion concentration, the pH value, and the temperature of the initial aqueous solution are within the preferred range for the reaction solution to be described below. Then, after the crystallization process starts, the mixed aqueous solution (a), the aqueous solution including the ammonium ion supplier (b), and the caustic alkali aqueous solution (c) are added to the initial aqueous solution as described above, and the reaction solution is formed.

The mixed aqueous solution (a) is a supply source of metal that forms the positive electrode active material precursor. For example, if the positive electrode active material precursor includes nickel and cobalt, the mixed aqueous solution (a) can include a nickel salt and a cobalt salt. An additional metal salt of the element M may also be included, as described above. Note that it is not necessary to add metal salts of all metals forming the positive electrode active material precursor, to the mixed aqueous solution (a). For example, aqueous solutions for supplying a plurality of metal components may be prepared by dividing the metal salts of the metals forming the positive electrode active material precursor, into different metal types, and the aqueous solutions for supplying the plurality of metal components may be used to supply the metals forming the positive electrode active material precursor.

The aqueous solution including the ammonium ion supplier (b) serves as a complexing agent to control the particle size and shape of the particles of the positive electrode active material precursor to be generated. Moreover, the ammonium ion is not incorporated into the particles of the positive electrode active material precursor to be generated, and is therefore a preferable complexing agent for obtaining particles of the positive electrode active material precursor having high purity.

The caustic alkali aqueous solution (c) is a pH adjusting agent for neutralization reactions.

The concentration of the metal salt forming the positive electrode active material precursor in the mixed aqueous solution (a), is not particularly limited, but is preferably greater than or equal to 0.5 mol/L and less than or equal to 2.2 mol/L. By setting the concentration to greater than or equal to 0.5 mol/L, the volume of liquid in each process can be reduced and the productivity can be increased. Further, by setting the concentration to less than or equal to 2.2 mol/L, for example, even when the temperature decreases, the recrystallization of the metal salt in the mixed aqueous solution (a) can be prevented. Note that when the metal salts of the metals forming the positive electrode active material are divided into a plurality of aqueous solutions to be added and supplied to the mixed aqueous solution (a), in all of the plurality of aqueous solutions for supplying the metal salts of the metals forming the positive electrode active material, it is preferable that the concentration of the metal salt satisfies the above-described range.

In the crystallization process, the pH of the reaction solution is not particularly limited; however, on the basis of 50° C., the pH of the reaction solution is preferably maintained at greater than or equal to 11.0 and less than or equal to 13.0, and more preferably maintained at greater than or equal to 11.0 and less than or equal to 12.5. By setting the pH of the reaction solution to greater than or equal to 11.0 and less than or equal to 13.0, the initial nucleation in the reaction system can be promoted and particle growth can be promoted on the basis of the nucleus. Accordingly, it is possible to obtain particles of a positive electrode active material precursor that have grown to a sufficient size.

During the crystallization process, the temperature of the reaction solution is preferably maintained at greater than or equal to 20° C. and less than or equal to 70° C., and more preferably maintained at greater than or equal to 40° C. and less than or equal to 70° C. By setting the temperature of the reaction solution to greater than or equal to 20° C., the generation of fine particles can be prevented. Further, it is possible to control the temperature without using a chiller and the like, thereby reducing the cost of equipment. Further, when the temperature is set to less than or equal to 70° C., it is possible to prevent the volatilization of ammonia and control the concentration of ammonium ions in the reaction system, particularly easily.

Further, during the crystallization process, the concentration of the ammonium ion in the reaction solution is preferably maintained at greater than or equal to 10 g/L and less than or equal to 25 g/L, and more preferably maintained at greater than or equal to 15 g/L and less than or equal to 20 g/L. By setting the ammonium ion concentration to greater than or equal to 10 g/L, the generation of fine particles can be prevented regardless of the solubility and the like of the metal forming the positive electrode active material, and the particle size of the resulting positive electrode active material precursor can be particularly increased. Further, when the particles are grown, it is possible to supply the salt of the metal that forms the positive electrode active material precursor to the inside of the particles, and nickel composite hydroxide particles having a high density can be obtained. Therefore, the density of the positive electrode active material prepared from the positive electrode active material precursor can be increased, and the energy density per volume can be increased.

By setting the ammonium ion concentration to less than or equal to 25 g/L, the concentration of the metal components forming the positive electrode active material precursor in the reaction solution, can be made particularly uniform, and the deviation of the composition in the positive electrode active material precursor can be particularly prevented.

The metal salt of the metal forming the positive electrode active material is preferably at least one of a sulfate, a nitrate, and a chloride, and more preferably, a sulfate that is not contaminated with halogen. For example, cobalt sulfate, nickel sulfate, and the like can be used.

Further, as described above, to the positive electrode active material precursor, it is possible to add one or more kinds of elements selected from Mg, Al, Ca, Ti, V, Cr, Mn, Zr, Nb, Mo, Sr, and W, as the element M. When adding the element M, a compound of the element M may be added to the mixed aqueous solution (a). Examples of the compound of the element M include, but are not limited to, magnesium sulfate, calcium nitrate, strontium nitrate, titanium sulfate, ammonium molybdate, sodium tungstate, ammonium tungstate, and the like. Here, examples of a compound of the element M are given; however, the compound of the element M is not limited to the above-described examples, and a variety of compounds may be used, including sulfate, nitrate, chloride, and the like including the desired element M.

Even when the compound of the element M is added to the mixed aqueous solution (a), the concentration of the mixed aqueous solution (a) is preferably maintained under the conditions described above. Further, the addition amount of the element M is adjusted so that the ratio of the number of atoms of metal ions present in the mixed aqueous solution (a) matches the ratio of the number of atoms of the metal element in the desired positive electrode active material precursor.

Note that the additive element M does not necessarily have to be added to the mixed aqueous solution (a) to co-precipitate. For example, the mixed aqueous solution (a) may be co-precipitated without adding the additive element M, and on the surface of the resulting co-precipitate, a compound such as a hydroxide or an oxide of the element M may be precipitated by a wet neutralization method. Further, when a plurality of types of the element M are added, the desired positive electrode active material precursor may be obtained by combining the above-described addition methods.

Further, when preparing the mixed aqueous solution (a), it is preferable that the metal salt be adjusted so that the ratio of the number of atoms of the metal ions present in the mixed aqueous solution matches the ratio of the number of atoms of the metal elements in the desired positive electrode active material precursor.

The aqueous solution including the ammonium ion supplier (b) is not particularly limited, but is preferably aqueous ammonia, an aqueous solution of ammonium sulfate or ammonium chloride, and more preferably one or more kinds of solutions selected from an aqueous ammonia or ammonium sulfate that is not contaminated with halogen. Further, the concentration of the ammonium ion supplier is not particularly limited, and it is sufficient to adjust the concentration so that the concentration of the ammonium ion can be maintained in each process.

The caustic alkali aqueous solution (c) is not particularly limited, and for example, an aqueous solution of an alkali metal hydroxide such as sodium hydroxide or potassium hydroxide may be used. In the case of an alkali metal hydroxide, it is preferable that the alkali metal hydroxide is added to the reaction system of each process as an aqueous solution due to the ease of controlling the pH value.

The method of the crystallization process is not particularly limited, but it is preferable that the mixed aqueous solution (a) and the aqueous solution including the ammonium ion supplier (b) are supplied quantitatively continuously, and the caustic alkali aqueous solution (c) is supplied by adjusting the amount of addition, so that reaction is performed by maintaining the reaction solution at a predetermined pH, and the reaction solution including the precursor particles is continuously overflowed from the reaction tank, thereby collecting the positive electrode active material precursor.

The reaction tank used in the crystallization process is not particularly limited, but is preferably a container including a stirrer, an overflow spout, and a temperature control means.

Note that in order to obtain a positive electrode active material precursor having a predetermined particle void ratio, for example, in the crystallization process, it is preferable to adjust the supply amount of the raw material solution to the capacity of the reaction tank. The contents of the reaction tank are constantly stirred, and while continuously mixing the raw material solution immediately after being supplied and the previously supplied raw material solution, the solutions overflow from the reaction tank to be discharged. Therefore, when the supply liquid volume of the raw material solution per unit time becomes excessively large relative to the substantial capacity of the reaction tank (actual liquid volume) to the overflow spout, the ratio of particles that have not undergone sufficient growth crystallization will increase among the particles discharged by the overflow, and depending on the crystallization conditions, the particle size will decrease or the particle void ratio will increase. However, if the supply liquid volume of the raw material solution per unit time is too low, the productivity will be reduced. The suitable range of the supply liquid volume per unit time to the substantial capacity to the overflow spout of the reaction tank to be used, will vary depending on the supply ratio and concentration of each aqueous solution forming the raw material solution to be supplied. Therefore, it is preferable to perform a preliminary test, select a suitable supply liquid volume ratio based on the relationship between the void ratio of the resulting positive electrode active material precursor and the crystallization conditions, and perform the crystallization process. According to the inventors of the present invention, it is preferable to adjust the ratio of the supply liquid volume of the raw material solution per minute to the substantial reaction tank capacity (actual liquid volume) to the overflow spout of the reaction tank, to greater than or equal to 0.25% and less than 0.40%.

During the crystallization process, the atmosphere in the reaction tank is not particularly limited, but can be, for example, air atmosphere, i.e., air (the oxygen concentration is approximately 21 volume %).

After the crystallization process, the resulting positive electrode active material precursor can be directly used as a raw material for the positive electrode active material.

Further, the positive electrode active material precursor may be roasted so that some or all of the included nickel composite hydroxide particles turn into nickel composite oxide particles, and used as the raw material of the positive electrode active material. As described above, when the positive electrode active material precursor is to be roasted, after the crystallization process of the method of manufacturing the positive electrode active material precursor according to the present embodiment, a roasting process in which the positive electrode active material precursor obtained by the crystallization process is roasted can be further carried out.

The conditions when roasting the positive electrode active material precursor obtained in the crystallization process are not particularly limited, and the roasting conditions can be selected according to the degree of conversion to the required oxide and the like.

In the roasting process, for example, the positive electrode active material precursor obtained by the crystallization process can be roasted at a temperature of greater than or equal to 500° C. and less than or equal to 700° C.

In the roasting process, the atmosphere in which the positive electrode active material precursor is roasted is not particularly limited as long as the atmosphere is a non-reducing atmosphere; however, the atmosphere is preferably an air flow in which the roasting can be easily performed.

The equipment used for roasting is not particularly limited as long as the positive electrode active material precursor can be heated in a non-reducing atmosphere, preferably in an air flow, and an electric furnace without gas generation is preferably used.

Note that the roasting process may be performed, for example, before the mixing process, in the manufacturing method of the positive electrode active material to be described below.

[Method of Manufacturing Positive Electrode Active Material]

The method of manufacturing the positive electrode active material according to the present embodiment is not particularly limited. The method of manufacturing the positive electrode active material according to the present embodiment can include, for example, the following processes.

A mixing process of preparing a mixture of the aforementioned positive electrode active material precursor and a lithium compound.

A firing process of firing the above-described mixture.

Each process will be described below.

(Mixing Process)

In the mixing process, a positive electrode active material precursor and a lithium compound are mixed to obtain a mixture (powder mixture).

The ratio when mixing the positive electrode active material precursor and the lithium compound is not particularly limited and may be selected depending on the composition of the positive electrode active material to be manufactured.

Li/Me hardly varies before and after the firing process described below, and, therefore, Li/Me in the mixture subjected to the firing process is almost the same as Li/Me in the resulting positive electrode active material. Therefore, it is preferable to mix the components of the mixture such that the Li/Me in the mixture prepared in the mixing process is the same as the Li/Me in the desired positive electrode active material.

For example, in the mixing process, it is preferable to mix the components such that the ratio (Li/Me) of the number of atoms of a metal (Me) other than lithium to the number atoms of lithium (Li) in the mixture is greater than or equal to 1.00 and less than or equal to 1.08. In particular, it is more preferable to mix the components such that the ratio (Li/Me) of the number of atoms of a metal other than lithium to the number atoms of lithium in the mixture is greater than or equal to 1.025 and less than or equal to 1.045.

The lithium compound to be subjected to the mixing process is not particularly limited, but for example, one or more kinds of elements selected from lithium hydroxide, lithium carbonate, and the like, may be preferably used.

As the mixing method for mixing the positive electrode active material precursor and the lithium compound in the mixing process, a general mixing machine may be used. For example, a shaker mixer, a Loedige mixer, a Julia mixer, a V-blender, and the like may be used.

Note that as described above, the roasting process may be performed in advance, and the mixing process may include preparing a mixture of a positive electrode active material precursor in which some or all of the nickel composite hydroxide particles are turned into nickel composite oxide particles, and a lithium compound.

(Firing Process)

In the firing process, the mixture obtained in the above-described mixing process is fired to form the positive electrode active material. When the mixture is fired in the firing process, the lithium in the lithium compound diffuses into the positive electrode active material precursor, to form the positive electrode active material.

In the firing process, although the firing temperature for firing the mixture is not particularly limited, for example, the firing temperature is preferably greater than or equal to 600° C. and less than or equal to 950° C., and more preferably greater than or equal to 700° C. and less than or equal to 900° C.

By setting the firing temperature to greater than or equal to 600° C., the diffusion of lithium into the positive electrode active material precursor can sufficiently proceed, and the crystal structure of the resulting positive electrode active material can be made uniform. For this reason, when this generated product is used as the positive electrode active material, the battery characteristics can be particularly enhanced, and is therefore preferable. Also, the reaction can proceed sufficiently, and, therefore, excess lithium residues and residual unreacted particles can be reduced.

By setting the firing temperature to less than or equal to 950° C., it is possible to prevent the progress of sintering between the particles of the positive electrode active material to be generated. Further, it is possible to prevent abnormal particle growth and prevent the coarseness of particles of the resulting positive electrode active material.

Further, in the process of raising the temperature to the firing temperature, the mixture can be maintained at a temperature near the melting point of the lithium compound for greater than or equal to 1 hour and less than or equal to 5 hours, and in this case, the reaction can be performed more uniformly, which is preferable.

In the firing time in the firing process, the time of maintaining a predetermined temperature, that is, the above-described firing temperature, is not particularly limited, but is preferably greater than or equal to 2 hours, and more preferably greater than or equal to 4 hours. This is because by setting the time of maintaining the firing temperature to greater than or equal to 2 hours, it is possible to sufficiently promote the generation of the positive electrode active material and to more reliably prevent the residue of the unreacted materials.

The upper limit of the time of maintaining the firing temperature is not particularly limited, but it is preferable that the time of maintaining the firing temperature is less than or equal to 24 hours in consideration of productivity and the like.

The atmosphere during firing is not particularly limited, but it is preferable to use an oxidizing atmosphere. As the oxidizing atmosphere, an oxygen-including gas atmosphere may be preferably used, and for example, it is more preferable that the atmosphere has an oxygen concentration of greater than or equal to 18 volume % and less than or equal to 100 volume %.

This is because by setting the oxygen concentration in the atmosphere to greater than or equal to 18 volume % during firing, the crystallinity of the positive electrode active material can be particularly enhanced.

When the atmosphere is an oxygen-including gas atmosphere, the atmosphere may be composed of gas, for example, air, oxygen, or a mixture of oxygen and an inert gas may be used.

Note that, for example, when a gas mixture of oxygen and an inert gas is used as the gas forming the oxygen-including gas atmosphere as described above, it is preferable that the oxygen concentration in the gas mixture satisfies the above-described range.

In particular, the firing process is preferably performed in an oxygen-including gas flow, and more preferably performed in an atmosphere or in an oxygen flow. Particularly, in consideration of battery characteristics, it is preferable to perform the firing process in an oxygen flow.

Note that the furnace used for firing is not particularly limited, as long as the furnace is capable of firing the mixture in an oxygen-including gas atmosphere. However, from the viewpoint of maintaining a uniform atmosphere inside the furnace, an electric furnace with no gas generation is preferable, and a batch-type furnace or a continuous-type furnace may be used.

The positive electrode active material obtained by the firing process may be aggregated or mildly sintered. In this case, the positive electrode active material may be crushed.

Here, crush means an operation in which an aggregate, which is formed of a plurality of secondary particles produced by sintering necking between secondary particles during firing, is subjected to mechanical energy, to separate the secondary particles with little destruction of the secondary particles themselves, so that the aggregate is loosened.

Further, it is preferable that a calcination process is performed before the firing process.

When the calcination is performed, the temperature of the calcination is not particularly limited, but may be lower than the firing temperature in the firing process. For example, the calcination temperature is preferably greater than or equal to 250° C. and less than or equal to 600° C., and more preferably greater than or equal to 350° C. and less than or equal to 550° C.

The calcination time, that is, the time of maintaining the aforementioned calcination temperature, is preferably, for example, greater than or equal to 1 hour and less than or equal to 10 hours, and more preferably greater than or equal to 3 hours and less than or equal to 6 hours.

After the calcination, the mixture can be cooled and then subjected to the firing process. However, the temperature can be increased from the calcination temperature to the firing temperature to perform the firing process continuously after the calcination.

Note that the atmosphere in which the calcination is performed is not particularly limited, but for example, the atmosphere may be the same as that in the firing process.

By performing calcination, lithium diffusion to the positive electrode active material precursor sufficiently proceeds, and it is possible to obtain a particularly uniform positive electrode active material.

The method of manufacturing the positive electrode active material according to the present embodiment may further include any process.

For example, a water-washing process can be performed to remove excess lithium compounds adhering to the surface of the resulting positive electrode active material.

In the water-washing process, for example, the positive electrode active material obtained in the firing process can be poured into pure water to form a slurry, and after stirring for a predetermined period of time, the positive electrode active material can be separated from water, filtered, and dried.

According to the method of manufacturing the positive electrode active material according to the present embodiment, the aforementioned positive electrode active material precursor is used, and, therefore, it is possible to include a sufficient amount of lithium components in the voids of the nickel composite hydroxide particles or the nickel composite oxide particles included in the positive electrode active material precursor, and to uniformly distribute the lithium components. Therefore, it is possible to uniformly distribute a sufficient amount of lithium components in the particles of the positive electrode active material obtained by the method of manufacturing the positive electrode active material according to the present embodiment, thereby facilitating the migration of lithium-ions and reducing the reaction resistance at the positive electrode. Further, the charge and discharge capacity can be increased.

[Non-Aqueous Electrolyte Secondary Battery]

Next, a configuration example of a non-aqueous electrolyte secondary battery according to the present embodiment will be described.

The non-aqueous electrolyte secondary battery according to the present embodiment can have a positive electrode formed from the aforementioned positive electrode active material as the positive electrode material.

First, an example of a structure of the non-aqueous electrolyte secondary battery according to the present embodiment will be described.

The non-aqueous electrolyte secondary battery according to the present embodiment can have a structure that is substantially similar to that of a general non-aqueous electrolyte secondary battery, except that the aforementioned positive electrode active material is used as the positive electrode material.

Specifically, the non-aqueous electrolyte secondary battery according to the present embodiment can have a structure including, for example, a case and a positive electrode, a negative electrode, an electrolyte solution, and a separator included within the case.

More specifically, the positive electrode and the negative electrode can be laminated via the separator to form an electrode body, and the resulting electrode body can be impregnated with an electrolyte solution. Then, it is possible to form a structure in which the portion between a positive electrode current collector at the positive electrode and a positive electrode terminal that leads to the outside, and the portion between a negative electrode current collector at the negative electrode and a negative electrode terminal that leads to the outside, are connected to each other using a lead for current collection and the like, and these elements are sealed in the case.

Note that the structure of the non-aqueous electrolyte secondary battery according to the present embodiment is not limited to the above-described example, and the external shape of the non-aqueous electrolyte secondary battery may be of various shapes, such as cylindrical and laminated shapes.

An example of the configuration of each part will be described below.

(Positive Electrode)

First, the positive electrode is described.

The positive electrode is a sheet-like part, and can be formed, for example, by applying and drying a positive electrode mixture paste including the previously described positive electrode active material on the surface of a current collector made of aluminum foil. Note that the positive electrode is appropriately processed in accordance with the battery to be used. For example, a cutting process may be performed in which a suitable size is formed depending on the desired battery, or a compression process may be performed by a roll press and the like in order to increase the electrode density.

The above-described positive electrode mixture paste can be formed by adding a solvent to the positive electrode mixture material and kneading the material. The positive electrode mixture material can be formed by mixing the aforementioned positive electrode active material in a powder form, a conductive material, and a binding agent.

The conductive material is added to provide suitable conductivity to the electrode. Although the material of the conductive material is not particularly limited, for example, graphite such as natural graphite, artificial graphite, and expanded graphite, or a carbon black-based material such as acetylene black and Ketjen black (registered trademark) may be used.

The binding agent serves as a binder of the positive electrode active material. The binding agent used for the positive electrode mixture material is not particularly limited, but one or more kinds of materials selected from, for example, polyvinylidene fluoride (PVDF), polytetrafluoroethylene (PTFE), fluorine rubber, ethylene propylene diene rubber, styrene butadiene, cellulosic resin, polyacrylic acid, and the like can be used.

Note that activated carbon and the like may be added to the positive electrode mixture material. By adding activated carbon and the like to the positive electrode mixture material, the electric double layer capacity of the positive electrode can be increased.

The solvent functions to dissolve the binding agent and disperse the positive electrode active material, the conductive material, the activated carbon, and the like in the binding agent. The solvent is not particularly limited, but an organic solvent such as, for example, N-methyl-2-pyrrolidone may be used.

Further, the mixing ratio of each substance in the positive electrode mixture paste is not particularly limited, and may be the same as in the case of, for example, the positive electrode of a general non-aqueous electrolyte secondary battery. For example, when the solid content of the positive electrode mixture material excluding solvent is 100 parts by mass, the content of the positive electrode active material can be greater than or equal to 60 parts by mass and less than or equal to 95 parts by mass, the content of the conductive material can be greater than or equal to 1 part by mass and less than or equal to 20 parts by mass, and the content of the binding agent can be greater than or equal to 1 part by mass and less than or equal to 20 parts by mass.

Note that the method of manufacturing the positive electrode is not limited to the above-described method. For example, the positive electrode mixture material or the positive electrode mixture paste may be subjected to press-molding, and then dried in a vacuum atmosphere, etc., to manufacture the positive electrode.

(Negative Electrode)

The negative electrode is a sheet-like part. For example, a metal lithium, a lithium alloy, and the like may be used for the negative electrode. Further, the negative electrode can be formed, for example, by applying and drying a negative electrode mixture paste on the surface of a current collector made of metal foil such as copper.

The negative electrode is formed by substantially the same method as that of the above-described positive electrode, although the components forming the negative electrode mixture paste, the composition thereof, and the material of the current collector are different, and various processes are performed as necessary in the same manner as for the positive electrode.

The negative electrode mixture paste can be made into a paste by adding a suitable solvent to the negative electrode mixture material which is a mixture of the negative electrode active material and the binding agent.

As the negative electrode active material, for example, a material including lithium, such as metallic lithium or a lithium alloy, or an occluding material capable of occluding and de-inserting lithium-ions can be used.

The occluding material is not particularly limited, but one or more kinds of materials selected from, for example, an organic compound fired body such as natural graphite, artificial graphite, phenolic resin and the like, and carbon material powder such as coke can be used.

When such an occluding material is used in the negative electrode active material, a fluorine-including resin such as PVDF may be used as the binding agent, and as the solvent for dispersing the negative electrode active material in the binding agent, an organic solvent such as N-methyl-2-pyrrolidone may be used, similar to the positive electrode.

(Separator)

The separator is arranged between the positive electrode and the negative electrode, and separates the positive electrode and the negative electrode, and functions to retain the electrolyte solution.

As the material of the separator, for example, a thin film, such as polyethylene or polypropylene, having a large number of fine pores may be used. However, as long as the separator has the above-described function, the separator is not particularly limited.

(Electrolyte Solution)

The electrolyte solution is formed by dissolving lithium salt as a supporting salt in an organic solvent.

The organic solvent may be one type of compound or a mixture of two or more kinds of compounds selected from a cyclic carbonate, such as ethylene carbonate, propylene carbonate, butylene carbonate, or trifluoropropylene carbonate; a chain carbonate, such as diethyl carbonate, dimethyl carbonate, ethyl methyl carbonate, or dipropyl carbonate; an ether compound, such as tetrahydrofuran, 2-methyl tetrahydrofuran, or dimethoxyethane; a sulfur compound, such as ethyl methyl sulfone or butane sulfone; or a phosphorus compound, such as triethyl phosphate or trioctyl phosphate.

The supporting salt may be $LiPF_6$, $LiBF_4$, $LiClO_4$, $LiAsF_6$, $LiN(CF_3SO_2)_2$, or a composite salt thereof.

Note that the electrolyte solution may include a radical scavenger, a surfactant, a flame retardant, and the like, to improve the battery characteristics.

In the above, the non-aqueous electrolyte secondary battery according to the present embodiment has been described as an example of a form in which an electrolyte solution (a non-aqueous electrolyte solution) is used as the electrolyte. However, the non-aqueous electrolyte secondary battery according to the present embodiment is not limited to such a form. For example, a solid electrolyte may be used as the electrolyte (non-aqueous electrolyte). A solid electrolyte has a characteristic of withstanding a high voltage. Examples of the solid electrolyte include inorganic solid electrolyte and organic solid electrolyte.

Examples of the inorganic solid electrolyte include an oxide-based solid electrolyte and a sulfide-based solid electrolyte.

The oxide-based solid electrolyte is not particularly limited. For example, a material including oxygen (O) and having a lithium-ion conductivity and an electron insulating property may be suitably used. Examples of oxide-based solid electrolyte include one or more kinds of components selected from lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—ZnO, $Li_{1+x}Al_xTi_{2-x}(PO_4)_3$ (0≤X≤1), $Li_{1+x}Al_xGe_{2-x}(PO_4)_3$ (0≤X≤1), $LiTi_2(PO_4)_3$, $Li_{3x}La_{2/3-x}TiO_3$ (0≤X≤2/3), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, a material including sulfur (S) and having a lithium-ion conductivity and an electron insulating property may be suitably used. Examples of sulfide-based solid electrolyte include one or more kinds of components selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and the like.

Note that as the inorganic solid electrolyte, a material other than the above may be used; for example, $Li_3N$, LiI, $Li_3N$—LiI—LiOH, and the like may be used.

The organic solid electrolyte is not particularly limited as long as the material is a polymer compound exhibiting ionic conductivity. For example, polyethylene oxide, polypropylene oxide, copolymers thereof, and the like may be used. Further, the organic solid electrolyte may also include a supporting salt (lithium salt).

As described above, when using a non-aqueous electrolyte secondary battery using a solid electrolyte as the electrolyte, that is, when the battery is used as an all-solid battery, the configurations other than the positive electrode active material can be changed from the aforementioned configuration as necessary.

EXAMPLES

Hereinafter, the present invention will be described in more detail with reference to examples. However, the present invention is not limited to the following examples.

In experiment examples 1 to 16, positive electrode active material precursors were manufactured and evaluated. Experiment examples 1 to 10 are practical examples, and experiment examples 11 to 16 are comparative examples.

Experiment Example 1

(Manufacture of Positive Electrode Active Material Precursor)

The crystallization process was performed according to the following procedure to manufacture $Ni_{0.88}Co_{0.12}(OH)_2$ as the positive electrode active material precursor.

A crystallizing device equipped with a reaction tank (a stirring tank) with a cylindrical shape inside, was prepared.

In the reaction tank, an impeller is provided so that the initial aqueous solution or reaction solution in the reaction tank can be stirred by the impeller. Further, the reaction tank is provided with an overflow spout and is configured to collect the positive electrode active material precursor generated by continuous overflow. Note that during the crystallization process, the atmosphere in the reaction tank is an air atmosphere, that is, an air atmosphere in which the oxygen concentration is approximately 21 volume %.

In this experiment example, a reaction tank with an internal capacity of 6000 L was prepared. Note that the capacity of liquid that can be accommodated in the range up to the overflow spout, that is, the actual liquid volume, is 5730 L.

Then, pure water was put into the reaction tank up to an amount of 5400 L, and the temperature in the reaction tank was set to 49° C. The initial aqueous solution and reaction solution were maintained at 49° C. until the crystallization process was completed.

Then, 25 mass % of aqueous ammonia was added to the water in the reaction tank as the aqueous solution including the ammonium ion supplier (b) so that the ammonium ion concentration of the initial aqueous solution was 14.5 g/L.

Further, as the caustic alkali aqueous solution (c), 24 mass % of a sodium hydroxide aqueous solution was added to the water in the reaction tank, and the pH was adjusted to 11.4, and was used as the initial aqueous solution.

Then, while stirring the initial aqueous solution with an impeller, the mixed aqueous solution (a) including nickel salt and cobalt salt, the aqueous solution including the ammonium ion supplier (b), and the caustic alkali aqueous solution (c) were continuously supplied in the initial aqueous solution to form a reaction solution, and crystallization of the positive electrode active material was performed.

The mixed aqueous solution (a) including nickel salt and cobalt salt used includes nickel sulfate as nickel salt and cobalt sulfate as cobalt salt. Each metal salt was added and mixed so that the amount of substance ratio of the material amount of nickel and cobalt in the mixed aqueous solution (a) was 88:12 and the concentration of the metal salt was 2.1 mol/L.

The aqueous solution including the ammonium ion supplier (b) and the caustic alkali aqueous solution (c) were the same aqueous solutions as the aqueous solutions used in preparing the initial aqueous solution.

During the crystallization process, to the initial aqueous solution and the reaction solution, the mixed aqueous solution (a) including nickel salt and cobalt salt was supplied at a supply rate of 9.65 L/min, the aqueous solution including the ammonium ion supplier (b) was supplied at a supply rate of 1.03 L/min, and the caustic alkali aqueous solution (c) was supplied at a supply rate of 4.80 L/min. Note that the ratio of the supplied liquid volume per minute to the actual liquid volume is 0.27%.

During the crystallization process, it was confirmed, with respect to the reaction solution, that the liquid temperature was maintained at 49° C., the pH was maintained in the range of greater than or equal to 11.1 and less than or equal to 11.7 on the basis of 50° C., and the ammonium ion concentration was maintained at 14.5 g/L.

The collected crystallized material was washed with water, filtered, and dried to obtain nickel composite hydroxide particles, which were the positive electrode active material precursor.

The average particle size of the resulting positive electrode active material precursor formed of a plurality of nickel composite hydroxide particles, was 12.5 μm, when measured using a laser diffraction scattering particle size analyzer (Microtrack HRA, manufactured by Nikkiso Co., Ltd.).

Further, the resulting plurality of nickel composite hydroxide particles were embedded in resin, and were subjected to cross-sectional polisher processing so that cross-sectional observation of the particles became possible, and were observed by SEM (Scanning Electron Microscope S-4700 manufactured by Hitachi High-Technologies, Ltd.).

From the particles of the obtained cross-sectional SEM images, ten particles (particle 1 to particle 10) were selected, for which the average value of the long side and the short side was in the range of ±1 μm of the average particle size of the above-described positive electrode active material precursor, and boundary lines were arranged in a grid over the entire cross section of each of the selected particles (particles to be evaluated). Note that at this time, the boundary lines were arranged so that one region partitioned by the boundary lines had a size of 2 μm square.

Then, on the cross section of each of the particles, a binarization process was performed using image analysis software (ImageJ, software developed by the National Institutes of Health, U.S.A.), and then for each of the regions partitioned by the boundary lines, the ratio of the area of voids in each region was calculated. Note that in the binarization process, a threshold was determined by a discrimination analysis method.

Next, with respect to the evaluated nickel composite hydroxide particles, the average value and the standard deviation of the area of voids in each region partitioned by the boundary lines were calculated. The results are given in Table 1.

Further, with respect to the selected 10 nickel composite hydroxide particles (particle 1 to particle 10), the average value and the standard deviation of the area of voids on the cross section were calculated.

The results are given in Table 1.

The resulting positive electrode active material precursor was roasted for 6 hours at 700° C. in an air flow (oxygen: 21 volume %), and the entire positive electrode active material precursor was turned into a nickel composite oxide (roasting process), and was then subjected to the process of manufacturing a positive electrode active material.

(Manufacture of Positive Electrode Active Material)

By the following procedure, a mixture of a lithium compound and a nickel composite oxide obtained after the roasting process described above, was prepared (mixing process).

As the lithium compound, a lithium hydroxide monohydrate (LiOH·H$_2$O) was subjected to anhydrous treatment by vacuum drying, and the resulting anhydrous lithium hydroxide was used.

In the mixing process, the lithium compound and the nickel composite oxide were weighed and mixed to form a mixture so that the ratio of the number of atoms of Li/Me in the mixture was 1.035. Here, Me refers to the total number of atoms of metals other than Li, and is the sum of Ni and Co.

The mixture obtained by the mixing process was loaded into a firing vessel having an internal dimension of 280 mm (L)×280 mm (W)×90 mm (H), and the mixture was fired by using a roller-hearth kiln, which is a continuous firing furnace, in which the maximum temperature (firing temperature) was set at 770° C. in an atmosphere having an oxygen concentration of 80 volume % with the remainder being inert gas (firing process). Further, the resulting fired product was charged into pure water to obtain an amount of substance ratio of 1.5 with respect to water 1 and a slurry was prepared. Then, after stirring for 30 minutes, filtration and drying were carried out to obtain a positive electrode active material (water-washing process).

(Manufacture of Non-Aqueous Electrolyte Secondary Battery)

The resulting lithium-nickel composite oxide was used as a positive electrode active material to fabricate and evaluate a 2032-type coin-type battery.

Figure 2:
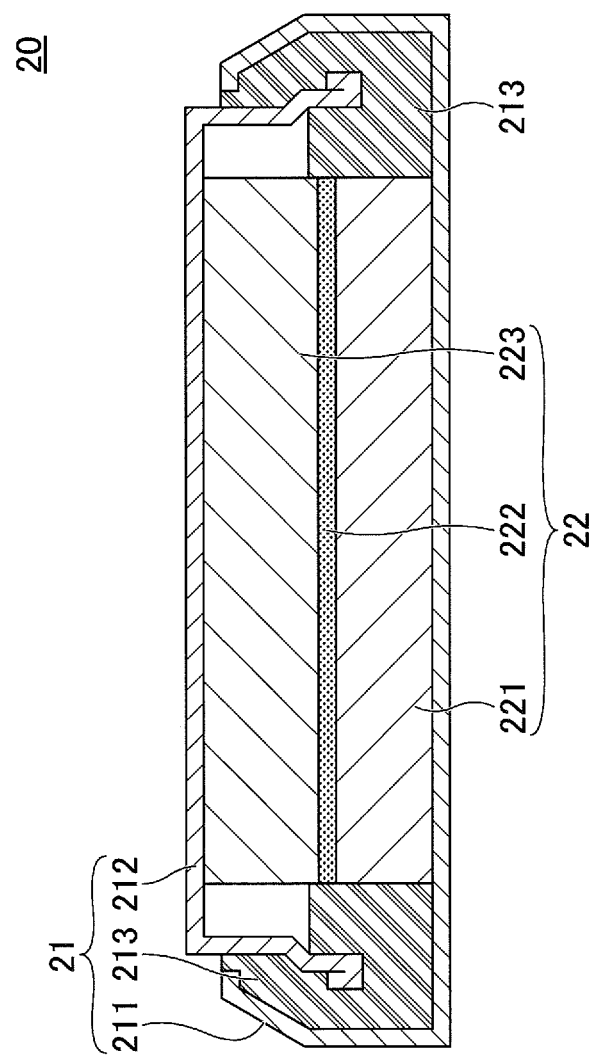
FIG. 2 is a diagram illustrating a cross-sectional configuration of a coin-type battery fabricated in an experiment example.

The configuration of the fabricated coin-type battery will be described with reference to FIG. 2. FIG. 2 schematically illustrates a cross-sectional diagram of a coin-type battery.

As illustrated in FIG. 2, a coin-type battery 20 includes a case 21 and an electrode 22 accommodated within the case 21.

The case 21 includes a positive electrode can 211 that is hollow and that has one end opened, and a negative electrode can 212 disposed at the opening of the positive electrode can 211. When the negative electrode can 212 is disposed at the opening of the positive electrode can 211, a space for accommodating an electrode 22 is formed between the negative electrode can 212 and the positive electrode can 211.

The electrodes 22 includes a positive electrode 221, a separator 222, and a negative electrode 223, which are stacked in this order. The positive electrode 221, which contacts the inner surface of the positive electrode can 211, and the negative electrode 223, which contacts the inner surface of the negative electrode can 212, are accommodated in the case 21.

Note that the case 21 includes a gasket 213, which fixes the positive electrode can 211 and the negative electrode can 212, so as to maintain an electrically insulating state between the positive electrode can 211 and the negative electrode can 212. The gasket 213 also has a function of sealing the gap between the positive electrode can 211 and the negative electrode can 212 so as to block the inside of the case 21 from the outside in an air-tight and liquid-tight manner.

This coin-type battery 20 was fabricated as follows. First, 52.5 mg of the resulting lithium-nickel composite oxide particles, 15 mg of acetylene black, and 7.5 mg of polytetrafluoroethylene (PTFE) resin were mixed with N-methyl-2-pyrrolidone which is a solvent, and were press molded at a pressure of 100 MPa to a diameter of 11 mm and a thickness of 100 μm, to fabricate the positive electrode 221. The fabricated positive electrode 221 was dried in a vacuum dryer for 12 hours at 120° C. The positive electrode 221, the negative electrode 223, the separator 222, and the electrolyte solution were used to fabricate the coin-type battery 20 in a glove box in an Ar atmosphere with the dew point controlled to −80° C.

Note as the negative electrode 223, a negative electrode sheet cut into a disk with a diameter of 14 mm was used. The negative electrode sheet was fabricated by applying, to copper foil, a negative electrode mixture paste, in which graphite powder having an average particle size of approximately 20 μm and polyvinylidene fluoride were mixed with N-methyl-2-pyrrolidone which is a solvent, and then drying the negative electrode mixture paste. Further, as the separator 222, a polyethylene porous membrane having a thickness of 25 μm was used. As the electrolyte solution, a mixture liquid (manufactured by TOMIYAMA PURE CHEMICAL INDUSTRIES, LTD.) of equal amount of ethylene carbonate (EC) and diethyl carbonate (DEC) using 1 M of LiClO$_4$ as the supporting electrolyte, was used.

[Battery Evaluation]

Figure 3A:
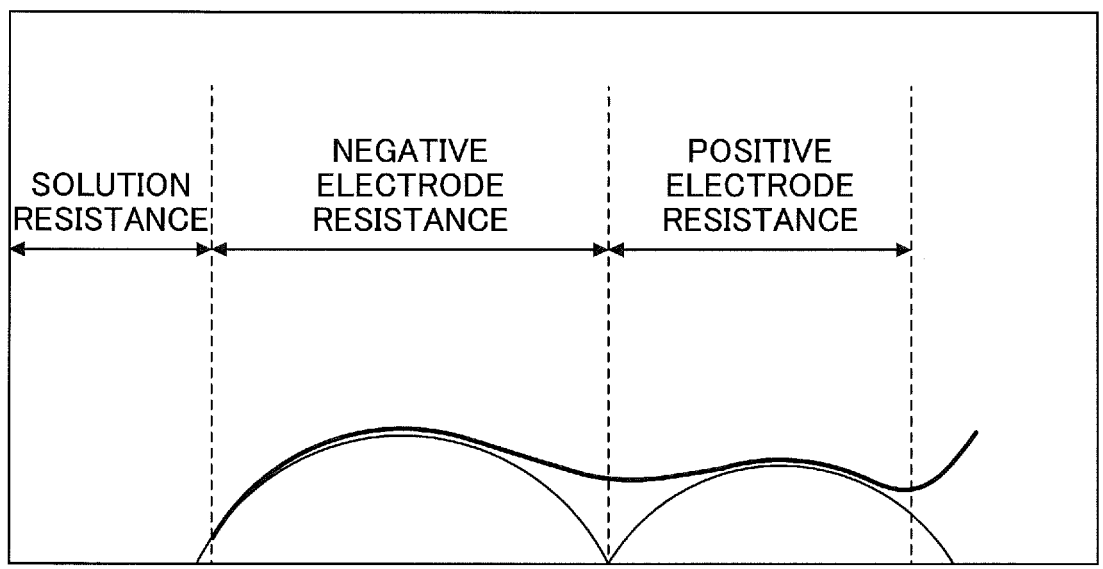
FIG. 3A is a diagram illustrating a measurement example of impedance evaluation.
Figure 3B:
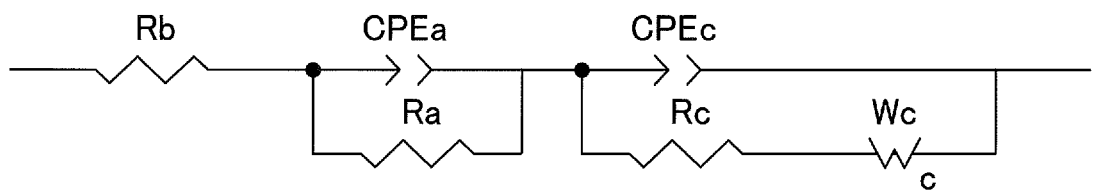
FIG. 3B is a schematic diagram illustrating an equivalent circuit used for analysis.

The resulting coin-type battery was charged at a charge potential of 4.1 V, and was measured by the AC impedance method using a frequency response analyzer and a potentiogalvanostat (manufactured by Solartron, 1255B), to obtain the Nyquist plot illustrated in FIG. 3A. The Nyquist plot is represented by the sum of characteristic curves indicating the solution resistance, the negative electrode resistance and the capacity thereof, and the positive electrode resistance and capacity thereof, and, therefore, a fitting calculation was performed using an equivalent circuit illustrated in FIG. 3B based on this Nyquist plot, to calculate the value of the reaction resistance. The reaction resistance is given in Table 1 as the reaction resistance ratio, in which the result of the present experiment example is used as the reference value for the following other experiment examples.

The evaluation results are given in Table 1.

Experiment Example 2 to Experiment Example 7

In manufacturing the positive electrode active material precursor, in the crystallization process, the positive electrode active material precursor, the positive electrode active material, and the non-aqueous electrolyte secondary battery were fabricated and evaluated in the same manner as experiment example 1, except that a reaction tank in which the reaction tank capacity and the actual liquid volume were the values indicated in Table 1 was used, and the supply rate of each solution and the ammonium ion concentration in the initial aqueous solution and the reaction solution were set as the values indicated in Table 1.

The evaluation results are given in Table 1.

Experiment Example 8

In manufacturing the positive electrode active material precursor, in the crystallization process, a reaction tank in which the reaction tank capacity and the actual liquid volume were the values indicated in Table 1 was used, and the supply rate of each solution and the ammonium ion concentration in the initial aqueous solution and the reaction solution were set as the values indicated in Table 1, to manufacture $Ni_{0.91}Co_{0.09}(OH)_2$ as the positive electrode active material precursor. Therefore, as the mixed aqueous solution (a) including nickel salt and cobalt salt, each metal salt was added and mixed so that the amount of substance ratio of nickel and cobalt was Ni:Co=91:9 and the concentration of the metal salt was 2.1 mol/L. Other than the above points, a positive electrode active material precursor, a positive electrode active material, and a non-aqueous electrolyte secondary battery were manufactured and evaluated in the same manner as experiment example 1. The evaluation results are given in Table 1.

Experiment Example 9

In manufacturing the positive electrode active material precursor, in the crystallization process, an aqueous solution (d) including the element M was further added. Then, each of the aqueous solutions of the mixed aqueous solution (a) including nickel salt and cobalt salt and the aqueous solution (d) including the element M was prepared by adding and mixing each metal salt in water, so that the amount of substance ratio of nickel, cobalt, and aluminum was Ni:Co: Al=88:8.5:3.5 and the concentration of the metal salt was 2.1 mol/L. Note that in the mixed aqueous solution (a) including nickel salt and cobalt salt, nickel sulfate was added as nickel salt, and cobalt sulfate was added as cobalt salt. In the aqueous solution (d) including the element M, sodium aluminate was added as aluminum salt.

Then, $Ni_{0.88}Co_{0.085}Al_{0.035}(OH)_2$ was manufactured as the positive electrode active material precursor, by using the reaction tank in which the reaction tank capacity and the actual liquid volume were the values indicated in Table 2, such that the supply rate of each solution and the ammonium ion concentration in the initial aqueous solution and the reaction solution were set as the values indicated in Table 2.

Other than the above points, a positive electrode active material precursor, a positive electrode active material, and a non-aqueous electrolyte secondary battery were fabricated and evaluated in the same manner as experiment example 1. Note that in the case of the present experiment example, the Me of Li/Me in the mixing process when manufacturing the positive electrode active material, is the total number of atoms of Ni, Co, and Al. The evaluation results are given in Table 2.

Experiment Example 10

In manufacturing the positive electrode active material precursor, in the crystallization process, an aqueous solution (d) including the element M was further added. Then, each of the aqueous solutions of the mixed aqueous solution (a) including nickel salt and cobalt salt and the aqueous solution (d) including the element M was prepared by adding and mixing each metal salt in water, so that the ratio of the amount of nickel, cobalt, and aluminum was Ni:Co:Al=91: 4.5:4.5 and the concentration of the metal salt was 2.1 mol/L in the aqueous solutions of the mixed aqueous solution (a) including nickel salt and cobalt salt and the aqueous solution (d) including the element M. Note that in the mixed aqueous solution (a) including nickel salt and cobalt salt, nickel sulfate was added as nickel salt, and cobalt sulfate was added as cobalt salt. In the aqueous solution (d) including the element M, sodium aluminate was added as aluminum salt.

Then, $Ni_{0.91}Co_{0.045}Al_{0.045}(OH)_2$ was manufactured as the positive electrode active material precursor, by using the reaction tank in which the reaction tank capacity and the actual liquid volume are the values indicated in Table 2, such that the supply rate of each solution and the ammonium ion concentration in the initial aqueous solution and the reaction solution are set as the values indicated in Table 2.

Other than the above points, a positive electrode active material precursor, a positive electrode active material, and a non-aqueous electrolyte secondary battery were manufactured and evaluated in the same manner as experiment example 1. Note that in the case of the present experiment example, the Me of Li/Me in the mixing process when manufacturing the positive electrode active material, is the total number of atoms of Ni, Co, and Al. The evaluation results are given in Table 2.

Experiment Examples 11 to 13

In manufacturing the positive electrode active material precursor, in the crystallization process, the positive electrode active material precursor, the positive electrode active material, and the non-aqueous electrolyte secondary battery were manufactured and evaluated in the same manner as experiment example 1, except that a reaction tank in which the reaction tank capacity and the actual liquid volume were the values indicated in Table 3 was used, and the supply rate of each solution and the ammonium ion concentration in the initial aqueous solution and the reaction solution were set as the values indicated in Table 3. The evaluation results are given in Table 3.

Experiment Example 14

In manufacturing the positive electrode active material precursor, in the crystallization process, the positive electrode active material precursor, the positive electrode active material, and the non-aqueous electrolyte secondary battery were manufactured and evaluated in the same manner as experiment example 8, except that a reaction tank in which the reaction tank capacity and the actual liquid volume were the values indicated in Table 1 was used, and the supply rate of each solution and the ammonium ion concentration in the initial aqueous solution and the reaction solution were set as the values indicated in Table 3. The evaluation results are given in Table 3.

Experiment Example 15

In manufacturing the positive electrode active material precursor, in the crystallization process, the positive electrode active material precursor, the positive electrode active material, and the non-aqueous electrolyte secondary battery were manufactured and evaluated in the same manner as experiment example 9, except that a reaction tank in which the reaction tank capacity and the actual liquid volume were the values indicated in Table 3 was used, and the supply rate of each solution and the ammonium ion concentration in the initial aqueous solution and the reaction solution were set as the values indicated in Table 3. The evaluation results are given in Table 3.

Experiment Example 16

In manufacturing the positive electrode active material precursor, in the crystallization process, the positive electrode active material precursor, the positive electrode active material, and the non-aqueous electrolyte secondary battery were manufactured and evaluated in the same manner as experiment example 10, except that a reaction tank in which the reaction tank capacity and the actual liquid volume were the values indicated in Table 3 was used, and the supply rate of each solution and the ammonium ion concentration in the initial aqueous solution and the reaction solution were set as the values indicated in Table 3. The evaluation results are given in Table 3.

TABLE 1

| | | | EXPERIMENT EXAMPLE 1 | EXPERIMENT EXAMPLE 2 | EXPERIMENT EXAMPLE 3 | EXPERIMENT EXAMPLE 4 | EXPERIMENT EXAMPLE 5 | EXPERIMENT EXAMPLE 6 | EXPERIMENT EXAMPLE 7 | EXPERIMENT EXAMPLE 8 |
|---|---|---|---|---|---|---|---|---|---|---|
| CRYSTALLIZATION CONDITION | REACTION TANK | REACTION TANK CAPACITY (L) | 6000 | 7000 | 7700 | 60 | 7000 | 7000 | 7000 | 7000 |
| | | ACTUAL LIQUID VOLUME (L) | 5730 | 6730 | 7460 | 57 | 6730 | 6730 | 6730 | 6730 |
| | SUPPLY RATE OF SUPPLY LIQUID (L/min) | MIXED AQUEOUS SOLUTION (a) | 9.65 | 12.45 | 12.40 | 0.097 | 13.60 | 12.50 | 13.60 | 12.40 |
| | | AQUEOUS SOLUTION INCLUDING AMMONIUM ION SUPPLY BODY (b) | 1.03 | 1.72 | 1.73 | 0.030 | 1.70 | 1.90 | 1.80 | 1.72 |
| | | CAUSTIC ALKALI AQUEOUS SOLUTION (c) | 4.80 | 8.09 | 8.25 | 0.049 | 8.00 | 7.95 | 7.90 | 8.10 |
| | | AQUEOUS SOLUTION INCLUDING ELEMENT M (d) | — | — | — | — | — | — | — | — |
| | AMMONIUM ION CONCENTRATION (g/L) | | 14.5 | 17.6 | 15.8 | 15.5 | 16.5 | 17.8 | 17.2 | 16.5 |
| | RATIO OF SUPPLY LIQUID VOLUME TO ACTUAL LIQUID VOLUME (%) | | 0.27 | 0.33 | 0.30 | 0.31 | 0.35 | 0.33 | 0.35 | 0.33 |
| POSITIVE ELECTRODE ACTIVE MATERIAL PRECURSOR | COMPOSITION | | | | | $Ni_{0.88}Co_{0.12}(OH)_2$ | | | | $Ni_{0.91}Co_{0.09}(OH)_2$ |
| | PARTICLE 1 | AVERAGE VALUE (%) | 4.6 | 2.1 | 2.8 | 1.7 | 3.2 | 2.1 | 3.1 | 0.6 |
| | | STANDARD DEVIATION | 0.9 | 0.6 | 0.5 | 0.5 | 0.8 | 0.9 | 0.7 | 0.2 |
| | PARTICLE 2 | AVERAGE VALUE (%) | 3.9 | 3.1 | 2.9 | 1.6 | 2.9 | 1.9 | 3.7 | 0.8 |
| | | STANDARD DEVIATION | 0.9 | 0.6 | 0.3 | 0.3 | 0.7 | 0.7 | 0.6 | 0.2 |
| | PARTICLE 3 | AVERAGE VALUE (%) | 4.1 | 2.5 | 3.2 | 1.8 | 3.2 | 1.2 | 5.8 | 0.6 |
| | | STANDARD DEVIATION | 0.8 | 0.8 | 0.2 | 0.5 | 0.6 | 0.2 | 0.8 | 0.2 |
| | PARTICLE 4 | AVERAGE VALUE (%) | 4.2 | 3.0 | 1.8 | 1.5 | 3.9 | 2.0 | 3.4 | 0.6 |
| | | STANDARD DEVIATION | 0.6 | 0.7 | 0.5 | 0.6 | 0.6 | 0.2 | 0.5 | 0.3 |

TABLE 1-continued

|  |  | EXPERIMENT EXAMPLE 1 | EXPERIMENT EXAMPLE 2 | EXPERIMENT EXAMPLE 3 | EXPERIMENT EXAMPLE 4 | EXPERIMENT EXAMPLE 5 | EXPERIMENT EXAMPLE 6 | EXPERIMENT EXAMPLE 7 | EXPERIMENT EXAMPLE 8 |
|---|---|---|---|---|---|---|---|---|---|
| PARTICLE 5 | AVERAGE VALUE (%) | 4.5 | 2.7 | 2.3 | 1.8 | 3.2 | 0.7 | 5.1 | 1.0 |
|  | STANDARD DEVIATION | 0.5 | 0.8 | 0.3 | 0.7 | 0.7 | 0.2 | 0.6 | 0.1 |
| PARTICLE 6 | AVERAGE VALUE (%) | 3.7 | 2.7 | 2.9 | 1.7 | 3.5 | 0.3 | 2.4 | 0.8 |
|  | STANDARD DEVIATION | 0.8 | 0.5 | 0.3 | 0.4 | 0.7 | 0.3 | 0.4 | 0.2 |
| PARTICLE 7 | AVERAGE VALUE (%) | 4.6 | 2.6 | 3.1 | 2.1 | 3.2 | 2.3 | 3.2 | 1.0 |
|  | STANDARD DEVIATION | 0.7 | 0.9 | 0.2 | 0.5 | 0.7 | 0.3 | 0.5 | 0.2 |
| PARTICLE 8 | AVERAGE VALUE (%) | 3.9 | 3.1 | 1.7 | 2.0 | 2.9 | 3.1 | 3.7 | 0.8 |
|  | STANDARD DEVIATION | 0.7 | 0.6 | 0.2 | 0.5 | 0.6 | 0.2 | 0.4 | 0.1 |
| PARTICLE 9 | AVERAGE VALUE (%) | 4.6 | 2.5 | 1.6 | 1.8 | 2.4 | 1.2 | 2.8 | 1.0 |
|  | STANDARD DEVIATION | 0.9 | 0.5 | 0.1 | 0.6 | 0.5 | 0.1 | 0.4 | 0.2 |
| PARTICLE 10 | AVERAGE VALUE (%) | 4.2 | 2.4 | 2.9 | 1.5 | 4.1 | 1.5 | 3.5 | 0.7 |
|  | STANDARD DEVIATION | 0.5 | 0.8 | 0.2 | 0.6 | 0.8 | 0.2 | 0.4 | 0.1 |
| VOIDS ON CROSS-SECTION OF PARTICLES 1 To 10 | AVERAGE VALUE (%) | 4.23 | 2.67 | 2.52 | 1.75 | 3.25 | 1.63 | 3.68 | 0.76 |
|  | STANDARD DEVIATION | 0.1001 | 0.0941 | 0.3396 | 0.0345 | 0.2182 | 0.6102 | 0.9613 | 0.0222 |
| NON-AQUEOUS ELECTROLYTE SECONDARY BATTERY | REACTION RESISTANCE RATIO | 1.0 | 0.7 | 0.8 | 0.6 | 1.0 | 0.9 | 0.9 | 0.6 |

TABLE 2

|  |  |  | EXPERIMENT EXAMPLE 9 | EXPERIMENT EXAMPLE 10 |
|---|---|---|---|---|
| CRYSTALLIZATION CONDITION | REACTION TANK | REACTION TANK CAPACITY (L) | 7000 | 7000 |
|  |  | ACTUAL LIQUID VOLUME (L) | 6730 | 6730 |
|  | SUPPLY RATE OF SUPPLY LIQUID (L/min) | MIXED AQUEOUS SOLUTION (a) | 12.48 | 12.40 |
|  |  | AQUEOUS SOLUTION INCLUDING AMMONIUM ION SUPPLY BODY (b) | 1.82 | 1.81 |
|  |  | CAUSTIC ALKALI AQUEOUS SOLUTION (c) | 7.95 | 7.88 |
|  |  | AQUEOUS SOLUTION INCLUDING ELEMENT M (d) | 2.77 | 3.40 |
|  | AMMONIUM ION CONCENTRATION (g/L) |  | 17.5 | 18.2 |
|  | RATIO OF SUPPLY LIQUID VOLUME TO ACTUAL LIQUID VOLUME (%) |  | 0.37 | 0.38 |
| POSITIVE ELECTRODE ACTIVE MATERIAL PRECURSOR |  | COMPOSITION | $Ni_{0.88}Co_{0.085}Al_{0.035}(OH)_2$ | $Ni_{0.91}Co_{0.045}Al_{0.045}(OH)_2$ |
|  | PARTICLE 1 | AVERAGE VALUE (%) | 3.1 | 1.0 |
|  |  | STANDARD DEVIATION | 0.5 | 0.2 |
|  | PARTICLE 2 | AVERAGE VALUE (%) | 3.2 | 0.7 |
|  |  | STANDARD DEVIATION | 0.5 | 0.2 |
|  | PARTICLE 3 | AVERAGE VALUE (%) | 2.5 | 1.2 |
|  |  | STANDARD DEVIATION | 0.3 | 0.3 |
|  | PARTICLE 4 | AVERAGE VALUE (%) | 2.7 | 0.9 |
|  |  | STANDARD DEVIATION | 0.4 | 0.2 |
|  | PARTICLE 5 | AVERAGE VALUE (%) | 4.3 | 1.2 |
|  |  | STANDARD DEVIATION | 0.7 | 0.2 |
|  | PARTICLE 6 | AVERAGE VALUE (%) | 3.9 | 0.9 |
|  |  | STANDARD DEVIATION | 0.6 | 0.1 |
|  | PARTICLE 7 | AVERAGE VALUE (%) | 4.5 | 0.9 |
|  |  | STANDARD DEVIATION | 0.7 | 0.3 |

TABLE 2-continued

|  |  |  | EXPERIMENT EXAMPLE 9 | EXPERIMENT EXAMPLE 10 |
|---|---|---|---|---|
|  | PARTICLE 8 | AVERAGE VALUE (%) | 3.2 | 1.1 |
|  |  | STANDARD DEVIATION | 0.5 | 0.3 |
|  | PARTICLE 9 | AVERAGE VALUE (%) | 2.3 | 0.8 |
|  |  | STANDARD DEVIATION | 0.4 | 0.2 |
|  | PARTICLE 10 | AVERAGE VALUE (%) | 2.9 | 0.7 |
|  |  | STANDARD DEVIATION | 0.3 | 0.1 |
|  | VOIDS ON CROSS-SECTION OF PARTICLES 1 TO 10 | AVERAGE VALUE (%) | 3.26 | 0.95 |
|  |  | STANDARD DEVIATION | 0.5040 | 0.0319 |
| NON-AQUEOUS ELECTROLYTE SECONDARY BATTERY | REACTION RESISTANCE RATIO |  | 1.1 | 0.8 |

TABLE 3

|  |  |  | EXPERIMENT EXAMPLE 11 | EXPERIMENT EXAMPLE 12 | EXPERIMENT EXAMPLE 13 | EXPERIMENT EXAMPLE 14 | EXPERIMENT EXAMPLE 15 | EXPERIMENT EXAMPLE 16 |
|---|---|---|---|---|---|---|---|---|
| CRYSTAL-LIZATION CONDITION | REACTION TANK | REACTION TANK CAPACITY (L) | 7000 | 6000 | 7000 | 7000 | 7000 | 7000 |
|  |  | ACTUAL LIQUID VOLUME (L) | 6730 | 5730 | 6730 | 6730 | 6730 | 6730 |
|  | SUPPLY RATE OF SUPPLY LIQUID (L/min) | MIXED AQUEOUS SOLUTION (a) | 14.65 | 13.75 | 14.95 | 15.20 | 15.10 | 17.00 |
|  |  | AQUEOUS SOLUTION INCLUDING AMMONIUM ION SUPPLY BODY (b) | 2.10 | 1.97 | 2.20 | 2.40 | 2.12 | 2.42 |
|  |  | CAUSTIC ALKALI AQUEOUS SOLUTION (c) | 9.85 | 9.30 | 9.70 | 10.12 | 8.99 | 11.10 |
|  |  | AQUEOUS SOLUTION INCLUDING ELEMENT M (d) | — | — | — | — | 3.12 | 4.51 |
|  | AMMONIUM ION CONCENTRATION (g/L) |  | 16.3 | 13.4 | 19.5 | 17.8 | 18.2 | 19.32 |
|  | RATIO OF SUPPLY LIQUID VOLUME TO ACTUAL LIQUID VOLUME (%) |  | 0.40 | 0.44 | 0.40 | 0.41 | 0.44 | 0.52 |
| POSITIVE ELECTRODE ACTIVE MATERIAL PRECURSOR | COMPOSITION |  | $Ni_{0.88}Co_{0.12}(OH)_2$ | $Ni_{0.88}Co_{0.12}(OH)_2$ | $Ni_{0.88}Co_{0.12}(OH)_2$ | $Ni_{0.91}Co_{0.09}(OH)_2$ | $Ni_{0.88}Co_{0.085}Al_{0.035}(OH)_2$ | $Ni_{0.91}Co_{0.045}Al_{0.045}(OH)_2$ |
|  | PARTICLE 1 | AVERAGE VALUE (%) | 4.5 | 7.2 | 5.8 | 7.1 | 8.1 | 5.1 |
|  |  | STANDARD DEVIATION | 1.2 | 2.2 | 0.9 | 1.1 | 1.9 | 0.8 |
|  | PARTICLE 2 | AVERAGE VALUE (%) | 5.6 | 6.4 | 6.3 | 5.1 | 8.4 | 6.8 |
|  |  | STANDARD DEVIATION | 1.3 | 1.0 | 1.4 | 0.9 | 1.5 | 1.0 |
|  | PARTICLE 3 | AVERAGE VALUE (%) | 5.6 | 8.1 | 6.1 | 5.1 | 7.2 | 4.2 |
|  |  | STANDARD DEVIATION | 1.5 | 2.8 | 1.1 | 1.0 | 1.3 | 1.3 |
|  | PARTICLE 4 | AVERAGE VALUE (%) | 5.6 | 5.1 | 5.3 | 8.9 | 5.3 | 8.2 |
|  |  | STANDARD DEVIATION | 1.1 | 0.8 | 0.9 | 1.2 | 0.9 | 1.1 |
|  | PARTICLE 5 | AVERAGE VALUE (%) | 4.0 | 5.2 | 6.2 | 3.5 | 6.2 | 5.2 |
|  |  | STANDARD DEVIATION | 1.6 | 0.8 | 2.1 | 1.3 | 1.1 | 0.6 |

TABLE 3-continued

|  |  |  | EXPERIMENT EXAMPLE 11 | EXPERIMENT EXAMPLE 12 | EXPERIMENT EXAMPLE 13 | EXPERIMENT EXAMPLE 14 | EXPERIMENT EXAMPLE 15 | EXPERIMENT EXAMPLE 16 |
|---|---|---|---|---|---|---|---|---|
|  | PARTICLE 6 | AVERAGE VALUE (%) | 3.9 | 6.1 | 5.8 | 5.1 | 4.5 | 5.3 |
|  |  | STANDARD DEVIATION | 1.5 | 1.1 | 1.8 | 0.9 | 1.5 | 0.7 |
|  | PARTICLE 7 | AVERAGE VALUE (%) | 5.6 | 5.4 | 6.1 | 6.4 | 8.2 | 5.1 |
|  |  | STANDARD DEVIATION | 1.1 | 0.7 | 1.5 | 2.1 | 2.1 | 1.1 |
|  | PARTICLE 8 | AVERAGE VALUE (%) | 4.7 | 4.9 | 7.1 | 3.5 | 7.8 | 6.1 |
|  |  | STANDARD DEVIATION | 1.2 | 1.1 | 2.3 | 1.4 | 1.9 | 0.8 |
|  | PARTICLE 9 | AVERAGE VALUE (%) | 5.9 | 5.1 | 6.0 | 12.1 | 5.7 | 5.8 |
|  |  | STANDARD DEVIATION | 1.3 | 1.0 | 1.7 | 1.3 | 0.7 | 0.7 |
|  | PARTICLE 10 | AVERAGE VALUE (%) | 4.8 | 6.1 | 6.1 | 6.2 | 6.4 | 4.8 |
|  |  | STANDARD DEVIATION | 1.1 | 0.9 | 1.2 | 0.8 | 1.7 | 1.7 |
|  | VOIDS ON CROSS-SECTION OF PARTICLES 1 TO 10 | AVERAGE VALUE (%) | 5.02 | 5.97 | 6.09 | 6.31 | 6.78 | 5.67 |
|  |  | STANDARD DEVIATION | 0.4816 | 0.9922 | 0.1922 | 6.0801 | 1.7109 | 1.1716 |
| NON-AQUEOUS ELECTROLYTE SECONDARY BATTERY | REACTION RESISTANCE RATIO |  | 1.2 | 1.2 | 1.3 | 1.2 | 1.3 | 1.2 |

According to the results indicated in Tables 1 to 3, it was confirmed that the reaction resistance ratio was as low as less than or equal to 1.1, in the positive electrode active materials of experiment examples 1 to 10 including particles in which, when the cross section of each of the nickel composite hydroxide particles was divided into a plurality of regions by predetermined boundary lines, the average value of the ratio of the area of voids in each region partitioned by the boundary lines was greater than or equal to 0.5% and less than or equal to 5.0%, and the standard deviation of the ratio of the area of the voids in each region partitioned by the boundary lines was and less than or equal to 1.0.

Note that in experiment examples 1 to 6 and 8 to 10, it was confirmed that all particles 1 to 10, which were particles to be evaluated, satisfied the above-described provision. However, it was confirmed that the reaction resistance ratio can be sufficiently reduced as long as at least one of the particles 1 to 10 to be evaluated satisfied the above requirements, and that also in experiment example 7 indicated in Table 1, the reaction resistance ratio was sufficiently reduced. Note that as obvious from Table 1, in experiment example 7, in terms of the ratio of the number of particles, 80% of the particles to be evaluated satisfy the above requirements.

On the other hand, in the positive electrode active materials of experiment examples 11 to 16 including particles 1 to 10 that did not satisfy the above-described provision of the void distribution, it was confirmed the reaction resistance ratio exceeded 1.1, which is high.

Further, experiment examples 1 to 10, with respect to the particles 1 to 10, it was confirmed that the average value of the ratio of the voids in the cross section was greater than or equal to 0.5% and less than or equal to 5.0%, and that the standard deviation of the ratio of the voids in the cross section of particles 1 to 10 was less than or equal to 1.0.

Although the positive electrode active material precursor for the non-aqueous electrolyte secondary battery has been described with reference to the embodiments and examples, the present invention is not limited to the above-described embodiments and examples. Various modifications and variations are possible within the scope of the present invention as defined in the claims.

The present application claims the priority of the patent application No. 2017-228253 filed with the Japan Patent Office on Nov. 28, 2017, and the entire contents of the patent application No. 2017-228253 are incorporated herein by reference.

The invention claimed is:

1. A positive electrode active material precursor for a non-aqueous electrolyte secondary battery, comprising:
    nickel composite hydroxide particles, wherein
        a cross section of each nickel composite hydroxide particle includes voids, and
        when the cross section of an entirety of the nickel composite hydroxide particle is divided into a plurality of regions by boundary lines arranged in a grid such that each of the plurality of regions partitioned by the boundary lines has a size of 2 μm square,
        an average value of a ratio of an area of the voids in an area of each of the plurality of regions of the entirety of the nickel composite hydroxide particle partitioned by the boundary lines, is greater than or equal to 0.5% and less than or equal to 5.0%, and
        a standard deviation of the ratio of the area of the voids in the area of each of the plurality of regions of the entirety of the nickel composite hydroxide particle partitioned by the boundary lines, is less than or equal to 1.0.

2. The positive electrode active material precursor for the non-aqueous electrolyte secondary battery according to claim 1, comprising:
    a plurality of the nickel composite hydroxide particles, wherein when a plurality of particles to be evaluated, which have a particle size that is greater than or equal to −1 μm and less than or equal to +1 μm with respect to an average particle size of the plurality of the nickel composite hydroxide particles, are selected from the plurality of the nickel composite hydroxide particles, a cross section of the entirety of each of the plurality of particles to be evaluated is divided into a plurality of regions by boundary lines arranged in a grid such that each of the plurality of regions partitioned by the boundary lines has a size of 2 μm square, and a ratio of a number of particles having particular characteristics among a number of the selected plurality of particles to be evaluated, is greater than or equal to 50%, the particular characteristics of the particles being that an average value of a ratio of an area of the voids in an area of each of the plurality of regions of the entirety of the nickel composite hydroxide particle partitioned by the boundary lines, is greater than or equal to 0.5% and less than or equal to 5.0%, and that a standard deviation of the ratio of the area of the voids in the area of each of the plurality of regions of the entirety of the nickel composite hydroxide particle partitioned by the boundary lines, is less than or equal to 1.0.

3. The positive electrode active material precursor for the non-aqueous electrolyte secondary battery according to claim 1, comprising:

a plurality of the nickel composite hydroxide particles, wherein an average value of a ratio of an area of the voids in an area of the cross section of the entirety of each nickel composite hydroxide particle of the plurality of the nickel composite hydroxide particles, is greater than or equal to 0.5% and less than or equal to 5.0%, and a standard deviation of the ratio of the area of the voids in the area of the cross section of the entirety of each nickel composite hydroxide particle of the plurality of the nickel composite hydroxide particles, is less than or equal to 1.0.

* * * * *